3,220,992
METHOD OF TREATING POLYVINYL ALCOHOL

Harold Diemer Smyser, Plainfield, and Ora L. Wheeler, Millington, N.J., assignors, by mesne assignments, to Cumberland Chemical Corporation, New York, N.Y., a corporation of Delaware
No Drawing. Filed June 11, 1962, Ser. No. 201,270
6 Claims. (Cl. 260—91.3)

This invention relates to new and useful procedures for preparing polyvinyl alcohol and improved forms of polyvinyl alcohol, and is more particularly concerned with the treatment of polyvinyl alcohol to improve its properties.

Polyvinyl alcohol resins are well-known polymeric materials used in many commercial operations or products, as films, adhesives, fibers, and coating applications. Polyvinyl alcohol may be considered a homopolymer of vinyl alcohol and is prepared mainly by the conversion or hydrolysis of polyvinyl esters. A major process utilizes the hydrolysis of polyvinyl acetate to prepare polyvinyl alcohol. Polyvinyl alcohol made in this manner is usually defined or described in terms of the mole percent of the polyvinyl acetate that has been converted to polyvinyl alcohol. Many grades of polyvinyl alcohol are manufactured with variations in the mole percent of polyvinyl acetate that has been converted. A particularly important type of polyvinyl alcohol is termed "fully hydrolyzed" polyvinyl alcohol. Fully hydrolyzed polyvinyl alcohol has about at least 97.5 mole percent of the polyvinyl acetate converted to polyvinyl alcohol.

For many applications fully hydrolyzed polyvinyl alcohol is used in a water solution. For example, films are cast from water solutions of the fully hydrolyzed material. To prepare these water solutions, a cold water slurry of the fully hydrolyzed polyvinyl alcohol is prepared, and the cold water slurry is heated with agitation to dissolve the polyvinyl alcohol. Many of the fully hydrolyzed polyvinyl alcohols known in the art have poor cold water slurrying characteristics and these materials may require large amounts of water to prepare a satisfactory slurry; or these materials may present problems when one attempts to prepare a water solution.

Further, prior art materials usually have high water retention characteristics. Water retention characteristics are important when a slurry of polyvinyl alcohol is prepared to wash the residual ash from the polyvinyl alcohol resin. If the solid resin obtained by filtering the slurry retains large amounts of water, then the resin will still contain a major portion of the ash. Polyvinyl alcohol resins that have high water retention characteristics are not desirable when a low ash content is required in the resin. Prior art materials may also be unsatisfactory or of poor quality because of high cold water solubles percentage values.

It is an object of this invention to provide a process and procedures whereby polyvinyl alcohol may be treated to improve the slurrying and solubility characteristics of the polyvinyl alcohol.

It is another object of this invention to provide polyvinyl alcohol having low water retention characteristics, low cold water solubles values, a high degree of hydrolysis, and improved slurrying and solubility characteristics.

A further object of this invention is to treat polyvinyl alcohol by a simple, and efficient process, whereby the treated polyvinyl alcohol has improved properties.

These and other objects, as well as other advantages of this invention will become apparent or will be clarified or detailed specifically in the following description.

In accordance with the present invention improved polyvinyl alcohol is prepared by subjecting polyvinyl alcohol to a combined heat and steam treatment. The combined heat and steam treating comprises maintaining the polyvinyl alcohol at a temperature within the range of about 40° C. to about 150° C. while subjecting the polyvinyl alcohol to the action or contact of steam until the moisture content of the polyvinyl alcohol is increased. Temperatures higher than about 150° C. may be used, but problems of heat damage, as burning or charring of the polyvinyl alcohol, may be encountered at temperatures above about 150° C. The amount of moisture added to the polyvinyl alcohol by the steam treatment may be varied; generally, a substantial amount of added moisture is required at lower temperatures of heat treatment for maximum improvements in the polyvinyl alcohol; while a smaller amount of added moisture is required at higher temperatures of heat treatment. Preferred operating conditions are heat treatment temperatures within the range of about 80° C. to about 130° C. and steam treatment where the amount of added moisture is about at least 1%, and more preferably where the amount of added moisture is about at least 3%. A particularly effective and advantageous process comprises a heat treatment temperature of about 104° C. and a steam treatment where the moisture added to the polyvinyl alcohol is about at least 3%.

Operating at low final added moisture content values is preferred and is advantageous, as the product polyvinyl alcohol is usually dried to a final moisture content of about 2% to 4% for subsequent use or sale. If after the steam and heat treatment, a high percentage of moisture is present in the polyvinyl alcohol an excessive amount of drying time and expense may be required. However, in some instances the use of a low heat treatment temperature and a steam treatment where a substantial amount of moisture is added to the polyvinyl alcohol may be of particular value.

As indicated, the preferred processes and procedures of this invention involve treating polyvinyl alcohol with steam until the moisture content of the polyvinyl alcohol is increased. It is possible to add water directly to the polyvinyl alcohol and then subject the polyvinyl alcohol to a heat treatment; or add water directly to polyvinyl alcohol that is at the heat treatment temperatures. Increasing the moisture content of polyvinyl alcohol by the direct addition of water may present problems. Generally a direct water addition procedure will require excessive amounts of water and long heat treatment periods. Agglomeration of the polyvinyl alcohol may also result. While this direct water addition procedure results in improvements of the polyvinyl alcohol properties, more satisfactory and desirable results are obtained by using a steam treatment to increase the moisture content of the polyvinyl alcohol. Adding moisture to the polyvinyl alcohol by steam treatment is the preferred method of practicing this invention.

Polyvinyl alcohol that is subjected to the heat treatment and steam treatment procedures of this invention has many of its properties improved. For example, these procedures result in an increase in the degree of hydrolysis of the polyvinyl alcohol. The procedures of this invention are of value in treating the many grades and types of polyvinyl alcohol. However, with one particular grade of polyvinyl alcohol a major problem is the slurrying and solubility characteristics of the polyvinyl alcohol. This particular grade of polyvinyl alcohol is termed "fully hydrolyzed" polyvinyl alcohol. Other grades of polyvinyl alcohol present less problems as to slurrying and solubility characteristics. The procedures and techniques of this invention are particularly applicable to fully hydrolyzed polyvinyl alcohol. Fully hydrolyzed polyvinyl alcohol is the preferred type or grade of polyvinyl alcohol to be treated by the procedures of this invention. Fully hydrolyzed polyvinyl alcohol contains a small amount of polyvinyl acetate that has not been converted to polyvinyl alcohol. This grade or type of polyvinyl alcohol is identified by the mole percent value of polyvinyl acetate that has been converted to polyvinyl alcohol, and this mole percent value is about at least 97.5%. This mole percent value is termed "degree of hydrolysis." Polyvinyl alcohols having a degree of hydrolysis of about at least 97.5% are preferred. Particularly advantageous results are obtained when fully hydrolyzed polyvinyl alcohol having a degree of hydrolysis of about at least 99.0% is treated according to the procedures of this invention.

Further, it is desirable that the polyvinyl alcohol to be treated be substantially dry; that is, the polyvinyl alcohol should have an original moisture content below about 10%. The best results are obtained when the polyvinyl alcohol is dry before heat and steam treatment. Preferred is an original moisture content below about 5%. Also, the original polyvinyl alcohol to be treated should be substantially free of any organic solvents, as methanol, ethanol, methyl acetate, or mixtures of organic solvents. Organic solvents decrease the effectiveness of the heat and steam treatment; and if such solvents are present in large amounts the optimum benefits and advantages of this invention will not be obtained.

The heat and steam treatment process and procedures may be conducted in a variety of ways; continuous process or batch process techniques may be employed. In general, the fully hydrolyzed polyvinyl alcohol to be treated is introduced into a suitably heated vessel. Vessels or equipment having steam heating jackets are satisfactory. The vessel should have means for agitating the introduced polyvinyl alcohol. Agitation may be provided by agitation of the vessel or the usual shaft impeller type of mixing apparatus. The polyvinyl alcohol being treated should be continuously agitated or mixed during the heat and steam treatment, in order that the polyvinyl alcohol receive uniform heat and steam treatment. The vessel also requires some means for introducing steam. A pipe or nozzle arrangement allowing the steam to spread throughout the vessel and contact the polyvinyl alcohol is satisfactory.

After the polyvinyl alcohol has been introduced into the vessel, the polyvinyl alcohol is heated to and maintained at the required or desired operating heat treatment and then steam is introduced into the vessel. The heat and steam treatment procedures may be varied. The polyvinyl alcohol may be heated to heat treatment temperature while steam is being introduced or the steam may be introduced and then the polyvinyl alcohol heated to the heat treatment temperature. When heat treatment temperatures above about 80° C. are used, the polyvinyl alcohol should not be heated above about 80° C. unless steam is being introduced. High heat treatment temperatures without steam may result in heat damage to the polyvinyl alcohol. In a preferred procedure where heat treatment temperatures above about 80° C. are used, the polyvinyl alcohol is preheated to about 80° C. and after steam introduction is started, the preheated polyvinyl alcohol is heated to and maintained at the heat treatment temperature above 80° C. The polyvinyl alcohol should be continuously mixed or agitated during the heat and steam treatment, as well as during any preheating period. The steam treatment time will vary and is dependent mainly on the time required to obtain the final added moisture content in the polyvinyl alcohol.

In general, the polyvinyl alcohol is maintained at the heat treatment temperature for about 2 minutes to about 45 minutes while steam is being introduced. The polyvinyl alcohol may also be subjected to the heat treatment for short periods, before and after the steam treatment. The total time of treatment will vary depending on the equipment being used, as well as the heat treatment conditions and the final added moisture content. The amount of steam used will depend on the quantity of polyvinyl alcohol being treated. The steam introduction rate should be sufficient to maintain a complete steam atmosphere in the treating chamber or area, whereby all of the polyvinyl alchohol will be subjected to the action and contact of the steam. Saturated steam at a temperature of 100° C. is satisfactory for the steam treatment. High temperature or superheated steam may also be used. Saturated steam at temperatures higher than 100° C. and pressures higher than atmospheric may be used.

After the heat and steam treatment is completed, the treated polyvinyl alcohol is usually dried to a moisture content of about 2% to about 4% for subsequent use. This drying may take place in the vessel used for the heat and steam treatment or conventional drying equipment and procedures may be used. If the product polyvinyl alcohol after treatment requires a low moisture content value for subsequent use or sale, it is advantageous to utilize treatment conditions that will introduce a small amount of added moisture; in order that the final drying does not require a great deal of time or equipment.

One advantage of this invention is the improvement obtained in the slurrying and solubility characteristics of the polyvinyl alcohol treated according to the procedures of the invention. The solubility and slurrying characteristics relate mainly to the problems encountered in preparing aqueous solutions of fully hydrolyzed polyvinyl alcohol. In preparing these aqueous solutions a slurry of the solid polyvinyl alcohol in water, at a temperature of about 20° C., is made up. This slurry is then heated slowly with agitation, to about 80° C., or higher, until an aqueous solution of the polyvinyl alcohol is obtained. If one attempts to dissolve solid polvinyl alcohol in water at high temperatures, about 80° C., a gel-like mass results, that cannot be readily converted to an aqueous solution of polyvinyl alcohol. If the polyvinyl alcohol has poor slurrying properties, one is limited as to the amount of polyvinyl alcohol that may be in the slurry. If this limit is exceeded, then the slurry type mass prepared will not dissolve readily upon heating. The slurry type mass is difficult to agitate and it is difficult to heat. It is desirable, therefore, that the polyvinyl alcohol have slurrying characteristics whereby satisfactory amounts of polyvinyl alcohol can be introduced in the slurry being prepared.

The slurrying and solubility characteristics of polyvinyl alcohol may be determined by an actual production type procedure with production euipment. That is, a slurry containing the maximum amount of polyvinyl alcohol that can be added, without a slurry type mass resulting, can be prepared. As previously indicated a slurry type mass of polyvinyl alcohol is not suitable. Actual production procedures, with heating and agitation to prepare the aqueous solution of polyvinyl alcohol will given an accurate indication of the slurrying and solubility characteristics of the polyvinyl alcohol.

A simple laboratory type test has been developed that indicates whether a sample of polyvinyl alcohol has satisfactory slurrying and solubility characteristics. This test is termed: "the cold water slurry characteristic test" of polyvinyl alcohol. The test is conducted by placing 350 grams of distilled water into a 250 ml. dye pot beaker. The beaker has a stirrer with a flat horizontal blade, ½" x 2" with a 15° twist at the tips. The blade is positioned ½" off the bottom of the beaker. With a stirrer speed of 1100 r.p.m., 30 grams of a polyvinyl alcohol sample to be tested are added rapidly to the water. After 15 seconds, from the time of the introduction of the 30 grams, about one gram of polyvinyl alcohol from the sample is added rapidly to the water. About one gram of polyvinyl alcohol from the sample is continually added at 15 second intervals until the vortex disappears and the surface of the stirred mixture or slurry is level. The test is conducted at room temperature, and the polyvinyl alcohol and water are at room temperature. The actual amount of polyvinyl alcohol added by the one gram increments used is added to the 30 grams originally added to give the total amount of polyvinyl alcohol used. This total weight figure is multiplied by the percent of actual polyvinyl alcohol in the sample, to give the corrected weight of polyvinyl alcohol used. The corrected weight figure is divided by the total weight of the final solution, which gives the fraction of actual polyvinyl alcohol in the slurry. Multiplying this fraction by 100 gives a percentage value that is termed: "Percent Cold Water Slurry Characteristic." Percent Cold Water Slurry Characteristics may be conveniently abbreviated and referred to as: "Percent CWSC."

The Percent CWSC test is an accurate correlation or indication of the slurrying and solubility characteristics of most types of polyvinyl alcohol. A value of Percent CWSC of 20% means that an aqueous solution containing more than about 20% by weight cannot be satisfactorily prepared. If more than about 20% by weight of polyvinyl alcohol is added to the slurry, an unsatisfactory slurry type mass will be obtained. The slurry type mass is unmanageable. The mass is difficult to agitate, has poor heat transfer properties, and as a result, a satisfactory aqueous solution of the polyvinyl alcohol cannot then be prepared by simply heating and agitating the slurry type mass. In some instances, to obtain a more accurate indication of the slurrying and solubility characteristics of the polyvinyl alcohol, an actual production type slurrying procedure should be used.

The procedures of this invention result in improvements in the degree of hydrolysis values, water retention properties, and cold water solubles values of the polyvinyl alcohol. Particularly marked improvement is obtained in the slurrying and solubility characteristics of fully hydrolyzed polyvinyl alcohol.

Polyvinyl alcohols having a very high degree of hydrolysis are desired for many applications, as film preparation. Any residual polyvinyl acetate in the polyvinyl alcohol will result in release of acetic acid, with resultant damage to or loss of film properties. As indicated the procedures of this invention increases the degree of hydrolysis of the polyvinyl alcohol.

The amount of water retained by the polyvinyl alcohol during washing operations is important with regard to ash removal. If the polyvinyl alcohol retains a large percentage of water, the amount of ash removed by washing will be small. This will mean that substantial washing will be required to remove a major amount of the ash. The ash in the polyvinyl alcohol is mainly the catalyst residue from the polyvinyl acetate conversion or hydrolysis process. Polyvinyl alcohol having a low ash content is desired for many applications. The amount of water retained by the treated polyvinyl alcohol is substantially less than the amount of water retained by untreated polyvinyl alcohol.

When polyvinyl alcohol, particularly fully hydrolyzed polyvinyl alcohol, is introduced into water at about 20° C., generally some of the polyvinyl alcohol will be soluble or will dissolve. The amount of cold water soluble material, in fully hydrolyzed polyvinyl alcohol, may vary from 1% to 20%, or more, depending on the particular type of polyvinyl alcohol. Polyvinyl alcohol having a large percentage of cold water soluble material may be undesirable for certain operations, especially when washing operations are utilized. Washing operations may result in the loss of some of this cold water soluble material. The percentage of cold water soluble material in polyvinyl alcohol is decreased when the polyvinyl alcohol is treated by the procedures of this invention.

Throughout the specification, examples, and tables, uniform nomenclature has been utilized. The degree of hydrolysis is the mole percent of polyvinyl acetate that has been converted to polyvinyl alcohol. The Percent CWSC values were obtained by the test procedure previously outlined. All temperatures are in degrees centigrade. Moisture addition values, moisture values, solids values, cold water soluble values, ash values, and water retention values, are all expressed in percent by weight.

The following Examples 1 through 7 are illustrative of the inventive features and inventive procedures of this invention, and are not intended to limit the area of invention. The various types of fully hydrolyzed polyvinyl alcohol used and described in the following examples were prepared by the base catalyzed hydrolysis (alcoholysis) of polyvinyl acetate.

Example 1

A J. H. Day ribbon blender was used to treat polyvinyl alcohol according to the invention. The blender was a dished-bottom kettle and was steam jacketed. Interior kettle volume was about 2 cubic feet. The kettle had a vertical center shaft with agitator blades near the bottom of the shaft. Steam was introduced into the kettle interior by a nozzle at the top of the kettle. The blender was charged with 4 pounds of fully hydrolyzed polyvinyl alcohol. The polyvinyl alcohol had a Percent CWSC value of 11.7% and an initial moisture content of 5%. The charge was blended or agitated for 15 minutes at 66° C. Saturated steam at 100° C. was then introduced into the charge for about 3.5 minutes. Blending was continued during steam introduction, and after steam introduction was completed, the charge was blended for an additional 10 minutes.

A sample of the heat and steam treated charge, about 300 grams, was removed from the blender. The sample had an added moisture content of 34.4%. The sample was then dried in a vacuum oven at 44° C. for about 16 hours; the final moisture content of the sample material was 0.04%. This sample of treated polyvinyl alcohol after drying had a percent CWSC value of 16%.

The charge remaining in the blender was again subjected to the action of steam for about 3.5 minutes and then blended for 10 minutes. After the blending, a sample of this material had an added moisture content of 42.5%; and after drying a moisture content of 1.8%. The dried material had a percent CWSC value of 18%.

That portion of the charge in the blender was again subjected to steam treatment for about 3.5 minutes, and then blended. The sample after blending had an added moisture content of 46.5%; while the dried material had a moisture content of 1.8%. The dried material had a percent CWSC value of 18%.

The material in the blender was again steam treated and blended. After blending, a sample had an added moisture content of 48.8% and was dried to a moisture content of 3.1%. The dried material had a percent CWSC value of 15.85%.

The material remaining in the blender was dried in the blender to a final moisture content of 4.5%. This dried material had a percent CWSC value of 15.7%.

In all of the above runs the polyvinyl alcohol was maintained at 66° C., during blending and steam treatment.

Example 2

Fully hydrolyzed polyvinyl alcohol was subjected to heat and steam treatment utilizing the procedures and apparatus of Example 1. The polyvinyl alcohol was maintained at 66° C. during blending before and after the steam treatment and during steam treatment. Steam was introduced for about 3.5 minutes. The untreated polyvinyl alcohol had an initial percent CWSC value of 9%, and an initial moisture content of 5%. A series of runs were made, where varying amounts of moisture were added to the polyvinyl alcohol by the steam treatment. Representative results of these runs are tabulated in the following Table I.

TABLE I

| Run Number | Percent Moisture Added by Steam Treatment | Percent Moisture After Drying | Percent CWSC Value After Drying |
|---|---|---|---|
| 1 | 4.0 | 3.1 | 11.08 |
| 2 | 6.6 | 2.9 | 12.4 |
| 3 | 14.4 | 3.4 | 14.2 |
| 4 | 15.6 | 3.8 | 15.66 |
| 5 | 5.8 | 2.3 | 11.14 |
| 6 | 7.1 | 2.2 | 11.38 |
| 7 | 8.4 | 2.7 | 11.32 |
| 8 | 9.6 | 2.6 | 11.65 |
| 9 | 12.5 | 3.4 | 14.4 |
| 10 | 10.0 | 2.2 | 12.3 |
| 11 | 11.0 | 2.8 | 14.73 |
| 12 | 17.0 | 2.6 | 14.82 |
| 13 | 27.5 | 2.8 | 17.05 |
| 14 | 40.0 | 3.0 | 17.25 | vinyl alcohol at an operating heat treatment temperature of about 104° C. during steam treatment. The steam introduced into the drying chamber had a temperature of about 110° C. The total time of steam introduction varied somewhat in these runs, but generally steam was introduced for about 15 minutes. After steam introduction into the drying chamber was discontinued, rotation of the dryer at 23 r.p.m. was continued for an additional 30 minutes; while the polyvinyl alcohol sample in the drying chamber was maintained at the heat treatment operating temperature of about 104° C. The following Table II is a tabulation of results of a representative series of heat and steam treatment runs utilizing the apparatus and procedures just described. The amount of steam added to the dryer is the total weight of steam in pounds.

TABLE II

| Run No. | Sample Weight, Pounds | Before Treatment | | | | Treatment | | After Treatment and Drying | | | |
|---|---|---|---|---|---|---|---|---|---|---|---|
| | | Solids, Percent | Hydrolysis Degree, Percent | Percent CWSC | Cold Water Solubles, Percent | Steam Added to Dryer, Pounds | Moisture Added to Sample, Pounds | Solids, Percent | Hydrolysis Degree, Percent | Percent CWSC | Cold Water Solubles, Percent |
| 1 | 10 | 94.8 | 99.35 | 11.8 | 5.5 | 0.61 | 0.36 | 93.7 | 99.45 | 17.4 | 0.32 |
| 2 | 10 | 94.8 | 99.35 | 11.8 | 5.5 | 1.22 | 0.73 | 96.4 | 99.46 | 17.2 | 0.45 |
| 3 | 10 | 95.0 | 99.87 | 7.7 | | 0.61 | 0.36 | 95.4 | 99.99 | 14.7 | |
| 4 | 10 | 95.0 | 99.87 | 7.7 | | 1.22 | 0.73 | 94.8 | 99.98 | 15.5 | |
| 5 | 10 | 91.2 | 99.87 | 9.1 | 0.88 | 0.61 | 0.36 | 90.0 | 99.98 | 19.6 | 0.00 |
| 6 | 10 | 95.0 | 99.85 | 8.9 | 2.05 | 0.61 | 0.36 | 95.3 | 99.96 | 15.2 | 0.74 |
| 7 | 10 | 98.6 | 99.47 | 10.4 | 5.58 | 1.06 | 0.64 | 95.4 | 99.79 | 19.8 | 0.32 |
| 8 | 10 | 98.2 | 99.40 | 9.7 | 2.84 | 1.06 | 0.64 | 95.4 | 99.67 | 19.8 | 0.20 |
| 9 | 10 | | | 8.0 | | 0.62 | 0.38 | | 99.99 | 21.0 | |
| 10 | 7 | | | 11.8 | | 0.62 | 0.38 | | 99.85 | 19.4 | |
| 11 | 10 | 96.4 | 99.65 | 10.0 | | 0.62 | 0.38 | 94.8 | 99.76 | 21.0 | |
| 12 | 10 | 96.4 | 99.65 | 10.0 | | 0.78 | 0.47 | 94.4 | 99.74 | 21.4 | |
| 13 | 10 | 98.0 | 99.60 | 7.7 | | 0.63 | 0.38 | 94.8 | 99.80 | 18.1 | |
| 14 | 1.47 | | | 9.0 | | 0.21 | 0.13 | 97.2 | 99.73 | 19.6 | |
| 15 | 10 | 97.4 | 99.82 | 14.1 | | 0.63 | 0.38 | 94.2 | 99.99 | 25.8 | |

*Example 3*

Fully hydrolyzed polyvinyl alcohol was treated according to the techniques of this invention by the following procedures. The solid polyvinyl alcohol to be treated was introduced into a steam jacketed rotary conical dryer. The amount of the polyvinyl alcohol sample introduced was usually 10 pounds; if the polyvinyl alcohol sample was not completely dry, a sufficient amount of polyvinyl alcohol was added to correspond to the listed sample weight of dry polyvinyl alcohol. The dryer was a Rota Cone dryer, and had a fully charged capacity or chamber volume of 1.1 cubic feet. The dryer had a steam nozzle allowing steam to be introduced into the interior of the dryer. After the polyvinyl alcohol had been put into the drying chamber, the dryer was closed and rotated continuously at 23 r.p.m. The drying chamber was vented, to allow any excess steam to escape to the atmosphere. The steam jacket was operated to preheat the polyvinyl alcohol sample in the drying chamber to about 80° C.; and after steam introduction had started, the jacket was operated to heat and to maintain the poly-

*Example 4*

Fully hydrolyzed polyvinyl alcohol was treated utilizing the procedures and apparatus of Example 3. A series of runs at various heat treatment temperatures were made. Table III is a tabulation of results obtained. All of the polyvinyl alcohol used was from the same production lot. The amount of steam added to the dryer is the total weight of steam in pounds.

*Example 5*

Fully hydrolyzed polyvinyl alcohol was treated according to the following procedures. The solid polyvinyl alcohol was introduced into one end of a cylindrical steam jacketed drum type dryer. The dryer was 12 inches in diameter and 7 feet long. The interior or drying chamber had a horizontal center shaft extending the whole length of the dryer. Mounted on the shaft were adjustable paddles. The paddles were adjustable to convey the polyvinyl alcohol through the dryer and to mix the polyvinyl alcohol while it was in the dryer. Six steam injection ports or nozzles on top of the dryer allowed

TABLE III

| Run No. | Sample Weight, Pounds | Before Treatment | | | | Treatment | | | After Treatment and Drying | | |
|---|---|---|---|---|---|---|---|---|---|---|---|
| | | Hydrolysis Degree, Percent | Solids, Percent | Percent CWSC | | Heat Treatment Temperature, °C. | Steam Added to Dryer, Pounds | Moisture Added to Sample, Pounds | Hydrolysis Degree, Percent | Solids, Percent | Percent CWSC |
| 1 | 10 | 99.35 | 94.8 | 11.8 | | 60 | 0.63 | 0.38 | | 96.0 | 13.1 |
| 2 | 10 | 99.35 | 94.8 | 11.8 | | 65.6 | 0.63 | 0.38 | 99.45 | 97.0 | 14.8 |
| 3 | 10 | 99.35 | 94.8 | 11.8 | | 65.6 | 1.26 | 0.76 | 99.44 | 92.4 | 17.2 |
| 4 | 10 | 99.35 | 94.8 | 11.8 | | 71.1 | 0.63 | 0.38 | 99.45 | 90.8 | 17.6 |
| 5 | 10 | 99.25 | 94.8 | 11.8 | | 71.1 | 1.26 | 0.76 | 99.46 | 93.2 | 17.3 |
| 6 | 10 | 99.35 | 94.8 | 11.8 | | 71.1 | 0.63 | 0.38 | 99.46 | 96.0 | 15.8 |
| 7 | 10 | 99.35 | 94.8 | 11.8 | | 71.1 | 0.63 | 0.38 | | 96.0 | 13.9 |
| 8 | 10 | 99.35 | 94.8 | 11.8 | | 82.2 | 0.63 | 0.38 | 99.44 | 96.2 | 14.3 |
| 9 | 10 | 99.35 | 94.8 | 11.8 | | 82.2 | 1.26 | 0.76 | 99.48 | 92.4 | 17.7 |
| 10 | 10 | 99.35 | 94.8 | 11.8 | | 93.3 | 0.63 | 0.38 | 99.46 | 95.0 | 15.0 |
| 11 | 10 | 99.35 | 94.8 | 11.8 | | 110.0 | 0.61 | 0.36 | 99.45 | 93.7 | 17.4 |
| 12 | 10 | 99.35 | 94.8 | 11.8 | | 115.6 | 0.63 | 0.38 | 99.44 | 95.6 | 15.4 | the introduction of steam throughout the length of the dryer. One steam injection port was located on the bottom of the dryer. Polyvinyl alcohol after being conveyed through the dryer was discharged through a bottom outlet port at the end of the dryer. A series of runs were made heat treating and steam treating fully hydrolyzed polyvinyl alcohol utilizing this drum type dryer or treater. Conditions of operation and results are tabulated in Table IV, for a representative series of runs. The sample weight of polyvinyl alcohol is the total amount of polyvinyl alcohol that has passed through the dryer in one hour. The steam figure is the total weight of steam in pounds added to the dryer during the one hour passage. The amount of moisture added figure is the total pounds of moisture added to the polyvinyl alcohol sample by the steam during the one hour passage. The steam addition rate was uniform so that the added moisture in the polyvinyl alcohol sample was uniform throughout the run.

While preferred embodiments of this invention have been described and illustrated, it is to be understood that widely different modifications of the invention may be made without departing from the scope and spirit of the invention. The invention is not to be limited by the foregoing examples and details of description except as defined by the following claims.

What is claimed is:

1. A method of treating polyvinyl alcohol having a moisture content below about 10% and a degree of hydrolysis of at least about 97.5%, and substantially free from organic solvents and adapted to be slurried in water, which comprises subjecting said polyvinyl alcohol to steam while continually agitating said polyvinyl alcohol to increase the moisture content of said polyvinyl alcohol by at least 1%, and wherein said polyvinyl alcohol while being subjected to steam is maintained at a temperature of about 40° C. to about 150° C. sufficient to improve the cold-water slurrying characteristics of said polyvinyl

TABLE IV

| | Before Treatment | | Treatment | | | | | After Treatment | |
|---|---|---|---|---|---|---|---|---|---|
| Run No. | Hydrolysis Degree, Percent | Percent CWSC | Sample of Polyvinyl Alcohol Treated, Pounds | Steam Added to Dryer, Pounds | Moisture Added to Sample, Pounds | Steam Temperature, ° C. | Heat Treated Temperature of Sample, ° C. | Hydrolysis Degree, Percent | Percent CWSC |
| 1 | 99.82 | 14.1 | 75 | 13.5 | 8.1 | 135 | 95.6 | 99.93 | 16.2 |
| 2 | 99.82 | 14.1 | 100 | 15.0 | 9.0 | 141.1 | 97.8 | 99.93 | 19.3 |
| 3 | 99.82 | 14.1 | 150 | 16.0 | 9.6 | 141.7 | 98.9 | 99.93 | 20.2 |
| 4 | 99.82 | 14.1 | 200 | 18.0 | 10.8 | 144.4 | 97.8 | 99.93 | 19.6 |
| 5 | 99.82 | 14.1 | 300 | 16.5 | 9.9 | 144.4 | 98.9 | 99.92 | 18.5 |
| 6 | 99.65 | 14.3 | 250 | 25.0 | 15.0 | 144.9 | 102.2 | 99.74 | 18.4 |
| 7 | 99.89 | 15.4 | 300 | 30.0 | 18.0 | 152.7 | 103.3 | 99.90 | 19.9 |

*Example 6*

As indicated one of the advantages of this invention is the improvement in water retention values of the polyvinyl alcohol; with subsequent lower ash content being attained after washing and filtration. A number of polyvinyl alcohol samples treated according to the procedures of Example 3 were tested as follows. One hundred grams of a slurry, 15% by weight of the treated polyvinyl alcohol, was filtered through a Buchner funnel and dried in an oven. The following Table V is a tabulation of the results obtained.

TABLE V

| Sample | Percent Water Retention, After Filtration | Percent Ash Before Treatment (As Na₂O) | Percent Ash After Drying (As Na₂O) |
|---|---|---|---|
| 1 [1] | 42.9 | 0.7 | 0.043 |
| 2 | 43.4 | 0.7 | 0.081 |
| 3 | 42.8 | 0.7 | 0.062 |
| 4 | 51.4 | 1.12 | 0.166 |
| 5 | 52.0 | 0.83 | 0.132 |
| 6 | 52.8 | 2.7 | 0.485 |
| 7 [2] | 90.0 | 2.7 | 2.0 |

[1] Sample #1 was washed with 300 grams of water after being filtered.
[2] Sample #7 is representative of untreated material.

*Example 7*

Fully hydrolyzed polyvinyl alcohol was heat treated and steam treated according to the procedures of Example 3. The heat treatment temperature was about 104° C. and the amount of moisture added by steam was about 3%. The properties of the fully hydrolyzed polyvinyl alcohol before and after steam and heat treatment were as shown in Table VI.

TABLE VI

| Properties | Before Treatment | After Treatment |
|---|---|---|
| Percent CWSC | 27 | 35.6 |
| Percent Hydrolysis | 99.5 | 99.62 |
| Percent Cold Water Solubles | 1.1 | 0.27 | alcohol, said steam being introduced at a rate to maintain a substantially complete steam atmosphere in the treating area, and drying the thus-treated polyvinyl alcohol to a final moisture content of no more than about 4%.

2. A method according to claim 1, wherein said polyvinyl alcohol has an increase in moisture content of about at least 3% following said steam treatment but prior to said drying, and wherein said polyvinyl alcohol while being subjected to steam is maintained at a temperature of about 104° C.

3. A method according to claim 1 wherein said polyvinyl alcohol has a moisture content increase of about at least 3% following said steam treatment but prior to said drying, wherein said final moisture content is in the range of about 2% to about 4%, and wherein said polyvinyl alcohol while being subjected to steam is maintained at a temperature within the range of about 80° C. to about 130° C.

4. A method according to claim 1, wherein said polyvinyl alcohol has a moisture content increase of about at least 6% following said steam treatment but prior to said drying, and wherein said polyvinyl alcohol while being subjected to steam is maintained at a temperature within the range of about 80° C. to about 130° C.

5. A method of treating fully hydrolyzed polyvinyl alcohol having a moisture content below about 10% and substantially free from organic solvents and adapted to be slurried in water having a degree of hydrolysis greater than about 99.0% which comprises agitating said polyvinyl alcohol while said polyvinyl alcohol is heated to a temperature within the range of about 80° C. to about 130° C., maintaining said heated polyvinyl alcohol at a temperature within the range of about 80° C. to about 130° C. while subjecting said heated polyvinyl alcohol to steam to increase the moisture content of said heated polyvinyl alcohol to about at least 3% added moisture, agitating said heated polyvinyl alcohol while being subjected to steam, and agitating said heated polyvinyl alcohol after said moisture content has been increased while said heated polyvinyl alcohol is maintained at a temperature within the range of about 80° C. to about 130° C., said steam being introduced at a rate to maintain a substantially complete steam atmosphere in the treating area, and drying the thus-treated polyvinyl alcohol to a final moisture content of no more than about 4%.

6. A method according to claim 5, wherein said heated polyvinyl alcohol is maintained at a temperature of about 104° C. when said heated polyvinyl alcohol is subjected to steam.

References Cited by the Examiner

UNITED STATES PATENTS

| | | | |
|---|---|---|---|
| 2,430,372 | 11/1947 | Stamatoff | 260—91.3 |
| 2,447,140 | 8/1948 | Shelton | 260—91.3 |
| 2,610,360 | 9/1952 | Cline | 260—91.3 |
| 3,066,999 | 12/1962 | Nakajo et al. | 260—91.3 |

WILLIAM H. SHORT, *Primary Examiner.*
LOUISE P. QUAST, *Examiner.*